(12) United States Patent
Leung (10) Patent No.: US 10,250,570 B2
(45) Date of Patent: Apr. 2, 2019

(54) SEPARATED INTELLIGENT CONTROL SYSTEM AND METHOD THEREOF

(71) Applicant: Ka Hung Leung, Hong Kong (HK)

(72) Inventor: Ka Hung Leung, Hong Kong (HK)

( * ) Notice: Subject to any disclaimer, the term of this patent is extended or adjusted under 35 U.S.C. 154(b) by 286 days.

(21) Appl. No.: 15/241,038

(22) Filed: Aug. 18, 2016

(65) Prior Publication Data

US 2017/0310644 A1    Oct. 26, 2017

(30) Foreign Application Priority Data

Apr. 26, 2016 (CN) .......................... 2016 1 0264297

(51) Int. Cl.
*H04L 29/06* (2006.01)
*H04L 29/08* (2006.01)
*H04W 12/04* (2009.01)
*H05B 37/02* (2006.01)

(52) U.S. Cl.
CPC .......... *H04L 63/0428* (2013.01); *H04L 63/06* (2013.01); *H04L 67/125* (2013.01); *H04W 12/04* (2013.01); *H05B 37/0272* (2013.01)

(58) Field of Classification Search
CPC .................................................. H04L 63/0428
See application file for complete search history.

(56) References Cited

U.S. PATENT DOCUMENTS 9,519,786 B1 *  12/2016  Laredo ..................... G06F 8/654
2002/0178366 A1 * 11/2002 Ofir ..................... G06F 21/6245
713/182
2006/0156026 A1 *  7/2006  Utin .......................... G06F 21/31
713/183
2007/0097878 A1 *  5/2007  Morioka ............... H04W 12/06
370/254
2012/0130547 A1   5/2012 Fadell et al.
2015/0063169 A1 *  3/2015  Lu ........................ H04L 12/282
370/254
2016/0050515 A1   2/2016 Johnson
2016/0189515 A1 *  6/2016  Shapiro .................... G08B 3/10
340/539.14

(Continued)

OTHER PUBLICATIONS

Office Action of Canadian Patent Application No. 2,945,593 dated Mar. 13, 2017.

*Primary Examiner* — Kambiz Zand
*Assistant Examiner* — Thanh H Le
(74) *Attorney, Agent, or Firm* — Wayne & Ken, LLC; Tony Hom (57) ABSTRACT

The present invention provides a separated intelligent control system comprising a WiFi intelligent controller. The WiFi intelligent controller comprises: a WiFi unit for performing network communication; a microprocessor connected with the WiFi unit for data transmission via the WiFi unit, the data comprising programs or instructions; and at least one multi-use interface. The multi-use interface comprises a plurality of pins. The plurality of pins is connected to the microprocessor. The microprocessor is used to change function of the plurality of pins of the multi-use interface via firmware. The WiFi intelligent controller can be independently and freely combined with external modules with different functions so as to achieve the desired functions of users. The combination of application is strengthened, so that users can freely combine or restructure each module at any time to be used in different appliances and situations.

17 Claims, 6 Drawing Sheets

(56) References Cited

U.S. PATENT DOCUMENTS

2016/0316110 A1* 10/2016 Ross .................... H04N 5/0733
2016/0323977 A1* 11/2016 Sun ..................... H04L 12/2816
2016/0379481 A1* 12/2016 Kim ....................... G08C 17/02
                                                        340/12.22

* cited by examiner

SEPARATED INTELLIGENT CONTROL SYSTEM AND METHOD THEREOF

CROSS-REFERENCE TO RELATED APPLICATIONS

The present application claims the benefit of Chinese Patent Application No. 201610264297.1 filed on Apr. 26, 2016, the entire content of which is hereby incorporated by reference.

FIELD OF INVENTION

The present invention relates to technology of Internet of Things (IOT), in particular to a separated intelligent control system, encryption and setting method thereof.

BACKGROUND OF INVENTION

Nowadays, IP network has been well developed. In Hong Kong or in most countries of the world, it becomes popular in every level. As a result, the concept of Internet of Things (IOT) evolves. At present, there are some corresponding products in the market. Most of these products are controlled by WiFi because WiFi network can cover a certain range without wiring, which is particularly suitable for IOT that needs to support applications of both specific and non-specific point networking. Different corresponding products already exist in the market, such as light bulbs, sockets or light buttons, but most of them are independent, single or fractional use, i.e. one product, a single IP or a single application.

Using WiFi lamp as an example, WiFi lamp is an independent appliance. If the user wants a complete lighting device, then does the user need to install multiple WiFi lamps in the lighting device? However, the volume of a WiFi lamp is large, it may not fit every lighting device. Even though it fits, the user has to use a plurality of IP, and the setting and operation are complicated. If a WiFi socket is used, then most of the chandeliers cannot be used. If different products are used in combination, is there a vendor can supply all suitable WiFi smart products? Moreover, for remote control, it is not easy to set up multiple IP addresses, because real IP addresses have to be used in Internet world. If a cloud server is used, there is an additional layer of set up and control. If the user uses a cross-vendor solution, it is more complex. For users concerned, it is of course better if more products can be contained in the intelligent environment, regardless of lighting or other appliances, as well as control functions. In addition, data and instruction transfer other than WiFi without encryption is another big problem. Whereas, most of the intelligent products in the market now have usage and security problems as mentioned above, and therefore these products are not popular.

SUMMARY OF INVENTION

The characteristic and advantages of the present invention will be described below.

In order to solve the foregoing technical problems, the present invention adopts a technical solution as mentioned below.

In one aspect, the present invention provides a separated intelligent control system comprising a WiFi intelligent controller. The WiFi intelligent controller comprises: a WiFi unit for performing network communication; a microprocessor connected with the WiFi unit for data transmission via the WiFi unit, the data comprising programs or instructions; and at least one multi-use interface. The multi-use interface comprises a plurality of pins. The plurality of pins is connected to the microprocessor. The microprocessor is used to change function of the plurality of pins of the multi-use interface via firmware.

In one embodiment of the present invention, the number of multi-use interfaces is two. The plurality of pins comprises power type pins and data type pins.

In another embodiment of the present invention, all data type pins of the multi-use interfaces can be set to GPIO mode for sending or receiving 0 or 1 signal to control on or off of external modules, and for communicating with external sensors and receiving feedback of the external sensors.

In yet another embodiment of the present invention, the power type pins of the multi-use interfaces comprise direct DC power supply pins or DC power supply pins controlled by instruction.

In yet another embodiment of the present invention, the plurality of pins of the multi-use interface can be changed firmware through the microprocessor and set as UART to connect with external serial port terminal.

In yet another embodiment of the present invention, the separated intelligent control system further comprises a setup key for being inserted into the multi-use interface to enable setup of the WiFi intelligent controller.

In another embodiment of the present invention, the separated intelligent control system further comprises a firmware replacement key for being inserted into said multi-use interface to enable upgrade or replacement of firmware.

In yet another embodiment of the present invention, the separated intelligent control system further comprises an encryption unit connected with the microprocessor for performing AES256 data encryption and decryption on data sent by the WiFi unit. The AES256 data encryption and decryption use a master key and a secondary key to encrypt and decrypt different data. The master key is acquired by a specific operation and is used to decrypt user-defined password. The secondary key is obtained by process of the user-defined password and is used for encryption and decryption of data transmission or storage.

In yet another embodiment of the present invention, the separated intelligent control system further comprises an external module connected to the WiFi intelligent controller. The external module comprises at least a power switch controller or sensor.

In yet another embodiment of the present invention, the power switch controller comprises a relay for controlling the firing switch. The separated intelligent control system further comprises a DC transformer for connecting with and supplying power to the WiFi intelligent controller.

In yet another embodiment of the present invention, the power switch controller is wired power controller or socket.

In yet another embodiment of the present invention, the sensor is used to detect ambient temperature, humidity, brightness or human infrared or used as a switch.

In yet another embodiment of the present invention, the separated intelligent control system further comprises a program control module for controlling the WiFi intelligent controller by running appropriate program, or set as a server to centrally manage multiple WiFi intelligent controllers online.

In yet another embodiment of the present invention, the program control module is on a mobile terminal or computer.

In another embodiment, the program control module is a mobile phone or a tablet.

In another aspect of the present invention, the present invention provides a setup method of a separated intelligent control system for setting up the separate intelligent control system of the first aspect of the present invention. The setup method comprises: inserting the setup key into the multi-use interface of the WiFi intelligent controller and then connecting the WiFi intelligent controller to power supply so that the WiFi intelligent controller is switched to AP mode for setting up the WiFi intelligent controller; using the program control module to connect with the separated intelligent control system via SSID of the WiFi intelligent controller; the program control module sending setting related information to the WiFi intelligent controller.

In another embodiment, except for firmware, all information and instructions transmitted after setting are set with passwords and keys are encrypted by AES256.

By using the separated intelligent control system and setting method of the present invention, the WiFi intelligent controller can be independently and freely combined with external modules with different functions so as to achieve the desired functions of users. The combination of application is strengthened, so that users can freely combine or restructure each module at any time to be used in different appliances and situations.

By reading this specification, the ordinary skills in the art will better understand the characteristics and contents of the technical solutions.

BRIEF DESCRIPTION OF DRAWINGS

Specific embodiments will be described below in combination with the drawings. The contents shown on the drawings are used for illustrative purpose, but not limiting the scope of protection of the present invention.

PREFERRED EMBODIMENTS OF THE PRESENT INVENTION

Figure 1:
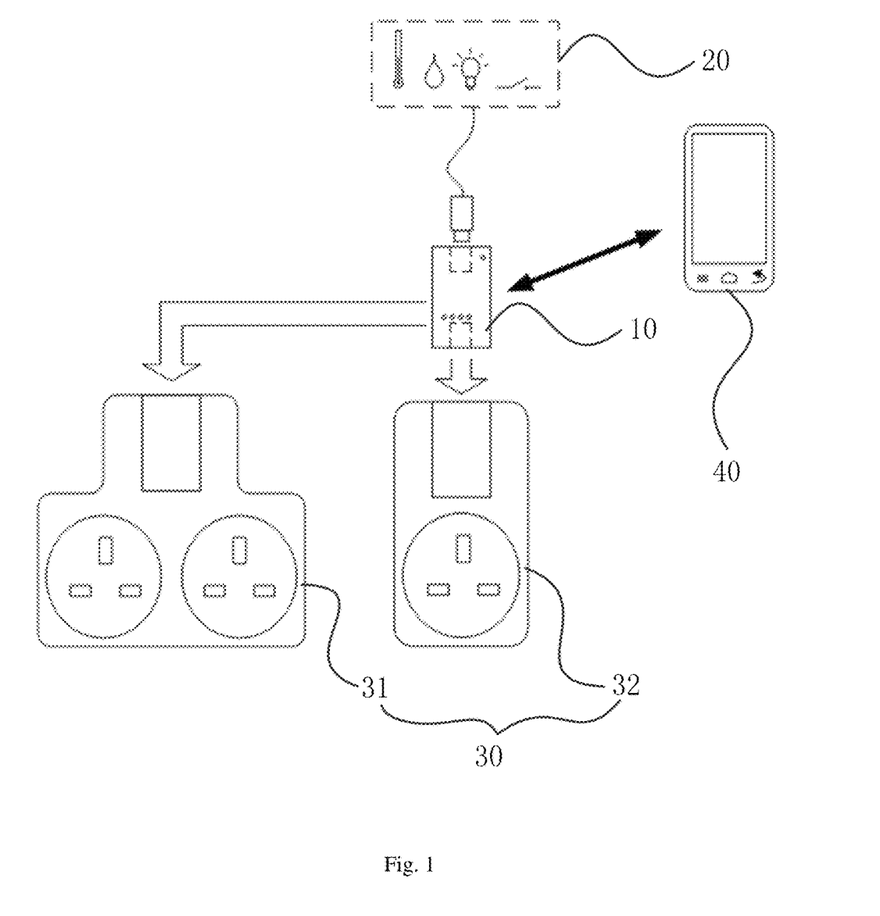
FIG. 1 is a structural diagram of the separated intelligent control system in a first embodiment of the present invention.
Figure 2:
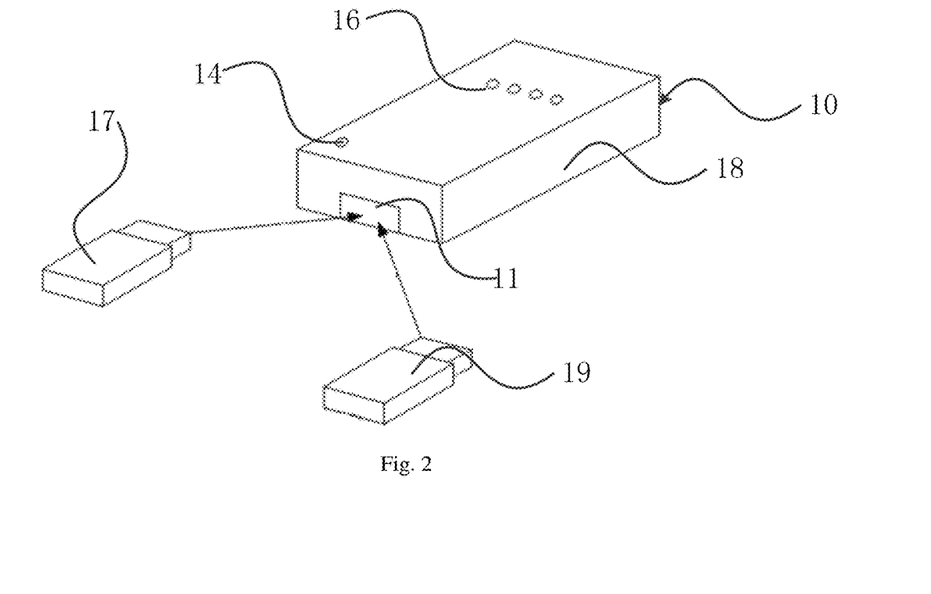
FIG. 2 is a structural diagram of the WiFi intelligent controller in one embodiment of the present invention.
Figure 3:
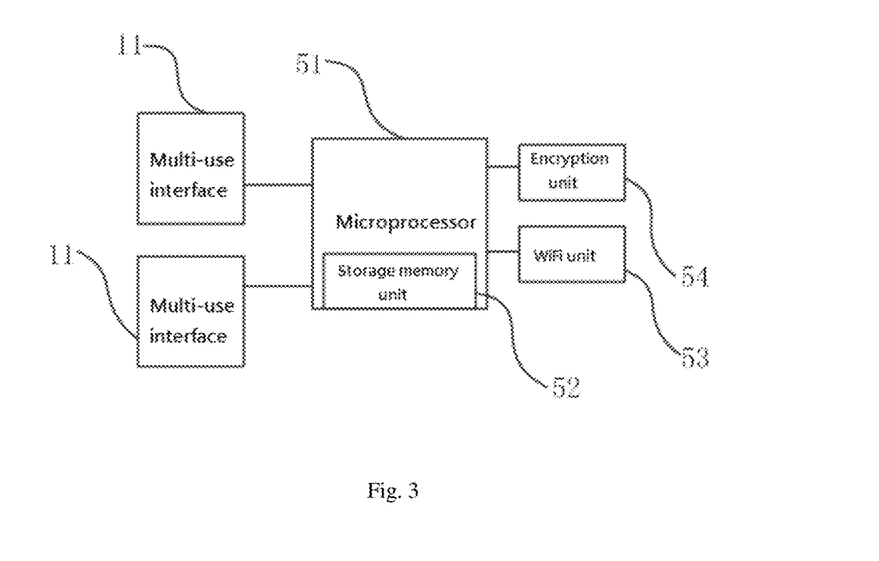
FIG. 3 shows the internal structure of the WiFi intelligent controller in one embodiment of the present invention.

As shown in FIGS. 1 to 3, the present invention provides a separated intelligent control system comprising a Wifi intelligent controller 10. The Wifi intelligent controller 10 comprises a housing 18 and at least one multi-use interface 11 on the housing 18. In this embodiment, the number of the multi-use interfaces 11 is two, being disposed on opposite sides of the housing 18. If there is only one multi-use interface, a power input can be included. In this embodiment, one of the two multi-use interfaces is used as power input port so that it can acquire power from a common USB socket or from the power switch controller 30, and the working voltage thereof is 4.9 to 5.2 V. Moreover, the housing 18 can have a power indicator 14 and a working or mode indicator 16.

Inside the housing 18, there are a microprocessor 51 and a WiFi unit 53 connected with the microprocessor 51. The microprocessor 51 is used to perform data transmission via the WiFi unit 53. The data includes programs (e.g. firmware of controller), setting data and instructions.

The multi-use interface 11 on the housing 18 has a plurality of pins directly or indirectly (e.g. via logic circuit) connected with the microprocessor 51. The plurality of pins can be defined by programing. In particular, the microprocessor 51 can change the function of the plurality of pins by using firmware. The pins can be categorized by different usages, including data type pins and power type pins for input and output of DC. Wherein, data type pins include PWM signal output pins for controlling strength of power consumption of external modules so as to control brightness of a lamp or speed of a motor. Data type pins also includes I2C, UART and ADC (Analog to Digital Convert). Besides, all data type pins of the multi-use interface can be set to GPIO mode for sending or receiving 0 or 1 signal to control on or off of external modules, and for communicating with external sensors and receiving feedback of the external sensors. Power type pins include a direct DC power supply pin and a DC power supply controlled by instruction. Referring to tables 1 and 2 below, tables 1 and 2 show the functions of plurality of pins of two multi-use interfaces respectively in this embodiment.

TABLE 1

Function Table of Each Pin of the First Multi-use Interface

| Pin No. | Pin Function |
| --- | --- |
| 1 | Switchable Vout = Vin (DC5~5.5 V) |
| 2 | GPIO, Sensor, UART RX (Level 0~3.3 V) |
| 3 | GPIO, AD convert, Sensor, UART RX (Level 0~3.3 V) |
| 4 | GND |
| 5 | GPIO, AD convert, Sensor (Level 0~3.3 V) |
| 6 | GPIO, AD convert, Sensor (Level 0~3.3 V) |
| 7 | GND |
| 8 | GPIO, Config (Level 0~3.3 V) |
| 9 | ~5 V Out |

TABLE 2

Function Table of Each Pin of the Second Multi-use Interface

| Pin No. | Pin Function |
| --- | --- |
| 1 | Vin (DC5~5.5 V) |
| 2 | GPIO, PWM, Relay Ctl (Level 0~5 V) |
| 3 | GPIO, PWM, Relay Ctl (Level 0~5 V) |
| 4 | GND |
| 5 | GPIO, I2C-SCL (Level 0~3.3 V) |
| 6 | GPIO, I2C-SDA (Level 0~3.3 V) |
| 7 | GND |
| 8 | GPIO, PWM, Relay Ctl (Level 0~5 V) |
| 9 | GPIO, Firmware update Enable |

As shown above, except power and ground, all pins in the first or second multi-use interface are GPIO (General Purpose Input Output) pins that can be programmed to control the function. In general, the interface P2 is a power input port which can acquire power from a common USB socket or from the power switch controller of this system, and the operating voltage of the interface P2 is between 4.9 to 5.2V. In addition to power and ground, all pins in the first or second multi-use interface are multifunctional, i.e. all these pins can be changed the usage by programs. For example, pin 2 and pin 3 of the second multi-use interface can simply send out 0 or 1 signal to control on or off of external modules, just like remote control switches. If the built-in program is changed, pin 1 and pin 2 can be set as PWM signal output, and then the pins can control the voltage strength of external modules so that the brightness of a lamp or the speed of a motor can be controlled, i.e. it becomes part of remote control of a toy car. In addition, by changing firmware of the WiFi intelligent controller 10, the plurality of pins of the multi-use interfaces 11 of the WiFi intelligent controller 10 can be set as UART to connect with external serial port terminals, such as serial printers, infrared remote control or used to set up other serial port setting appliances such as Cisco switches.

Since the pin function of the multi-function interface 11 is implemented by firmware, the microprocessor 51 also has a storage memory unit 52 for storing firmware (main) of the controller. The firmware can be used to alter the function of plurality of pins of the multi-use interface 11 and alter all control functions of the WiFi intelligent controller 10, etc. In this embodiment, the system further includes a firmware replacement key 19 for being inserted into the multi-use interface 11 to enable upgrade or replacement of firmware of the storage memory unit 52. When it is needed to change the program, firmware replacement key 19 can be inserted and then different programs can be downloaded from external devices with WiFi function to the WiFi intelligent controller 10.

In the present embodiment, the system further includes an encryption unit 54 connected with the microprocessor 51 for performing encryption on data sent by the WiFi unit 53. In practice, the data sent by the WiFi unit 53 can be performed necessary encryption by WiFi itself and another additional AES256 data (for example, transmitted data, instructions, setting data and user customized password, etc.) encryption and decryption. The AES256 data encryption and decryption use two different keys (master key and secondary key) to encrypt and decrypt different information. The master key and secondary key are recorded in the firmware (hard coded). When the Wifi intelligent controller 10 is activated, the firmware will first be performed specific operation (the operation result of each controller is different, so even if the data is retrieved, it cannot be decrypted in another controller), and then used to decrypt the user-defined password (the same applies when the user password is stored), and then this password is used to handle the secondary key. The secondary key after process will be used to encrypt and decrypt setting, instruction, transmission and storage of data. Because the processing method of the key is unique, it cannot be used in other systems. In addition, except the firmware, the WiFi intelligent controller 10 is totally encrypted, and thus the level of security is very high. In general, in addition to firmware, the transmitted information and instruction after setting are set with password and the key is encrypted by AES256.

The same as other networking products, the WiFi intelligent controller 10 has to be set up before work. However different from other networking products, the setting of the WiFi intelligent controller 10 of the present invention is not activated by button (Press Reset Button) or just set by a password on a web page, but is activated by inserting a setup key. Specifically, the WiFi intelligent controller 10 further includes a setup key 17 for being inserted into the multi-use interface 11 to enable setup of the Wifi intelligent controller 10. Using the setup key 17 to set up the WiFi intelligent controller 10, it will avoid adding a button or opening a hole on the WiFi intelligent controller 10 as setting is not often done. On the other hand, using a tangible setup key 17 can effectively prevent abnormal setting change.

In this embodiment, the separated intelligent control system further includes a program control module 40. The program control module 40 is used to exchange data with the WiFi intelligent controller 10. The data includes program (such as firmware of the controller) for changing the function of plurality of pins of the multi-use interface 11, data and instruction related to setting, and feedback of the external modules. The setting, relevant upgrade and replacement of firmware of the WiFi intelligent controller 10 can be done through the program control module 40. The program control module 40 can send on and off instruction to the WiFi intelligent controller 10, the method thereof including general push button action, somatosensory action (for example, shaking the phone to activate on or off), preset time action or sensor trigger action, etc. The program control module 40 may also be set as a server to centrally manage multiple WiFi intelligent controllers 10 online and in the meantime communicate with the external remote clients via IP or short message service (SMS), and receive and send back instructions or information. The program control module 40 can also act as a client to send instructions via IP, domain name or short message service (SMS) to a remote server, or to receive a response or information. In specific implementation, the program control module 40 can be provided on the mobile terminals or computers. Mobile terminals include mobile phones and tablets.

Figure 4:
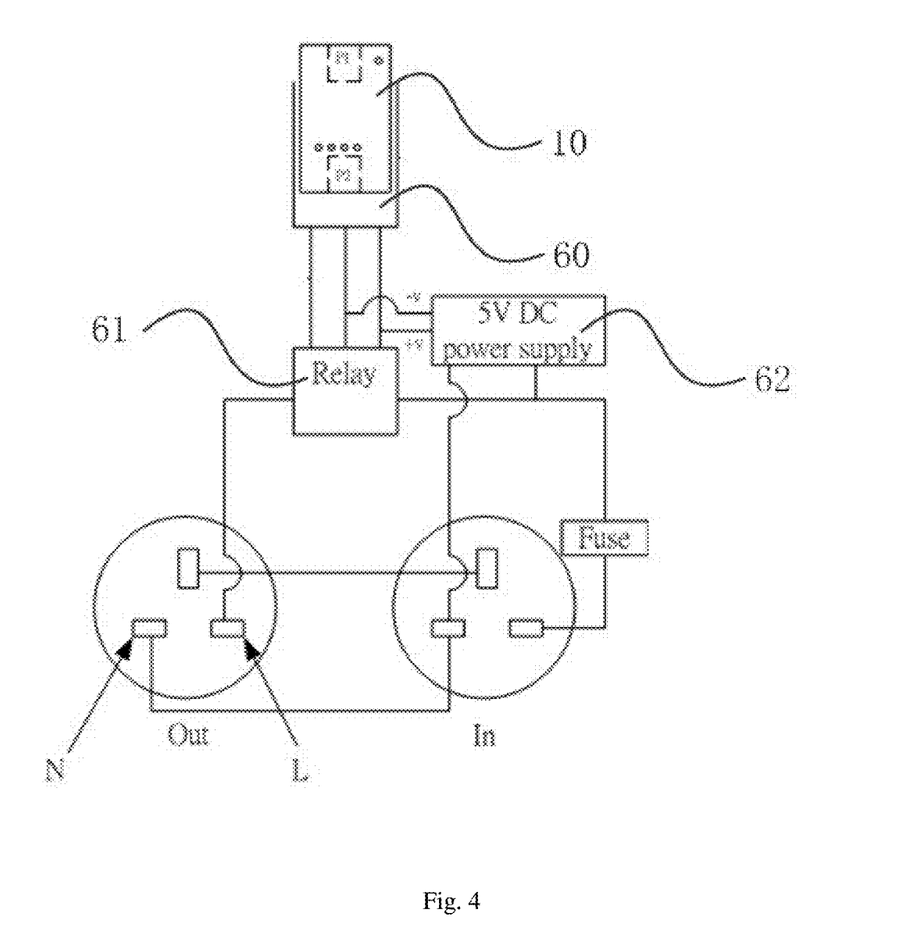
FIG. 4 is a structural diagram of the socket of the power switch controller in one embodiment of the present invention.

As shown in FIG. 1, the system further includes an external module connected with the WiFi intelligent controller 10. The external module includes a power switch controller 30 or a sensor 20. When the WiFi intelligent controller 10 is running the sensor 20 or the power switch controller 30, its function is to make a multi-use interface to be accessed by the sensor, and the other multi-use interface to act as a switch and work together with the program control module 40. Wherein, the sensor 20 can be used to detect the ambient temperature, humidity or brightness, thereby assisting the WiFi intelligent controller 10 to detect the environmental data. Because the whole system is modular, the sensors that can be supported will be increased during development. The power switch controller may be the socket 30. The socket 20 can be in the forms of socket 31 and socket 32. Now referring to FIG. 4, inside the socket, there are ordinary copper, a relay 61 for controlling on and off of the firing line, a DC power supply 62 connected with and supplying power to the WiFi intelligent controller 10, and relevant signal lines. If it is needed to charge the WiFi intelligent controller 10, the charging cradle 60 can be used.

Figure 5:
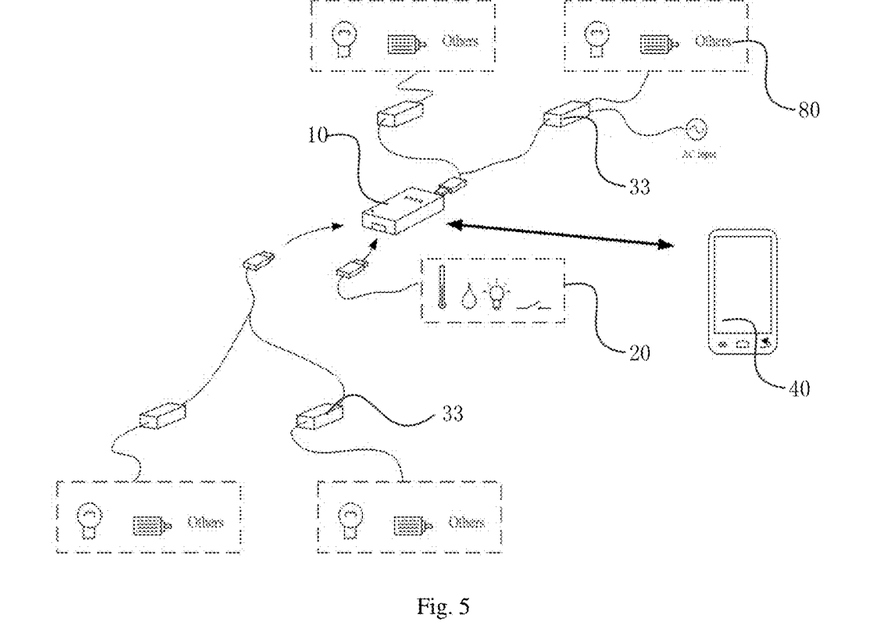
FIG. 5 is a structural diagram of the separated intelligent control system in a second embodiment of the present invention.
Figure 6:
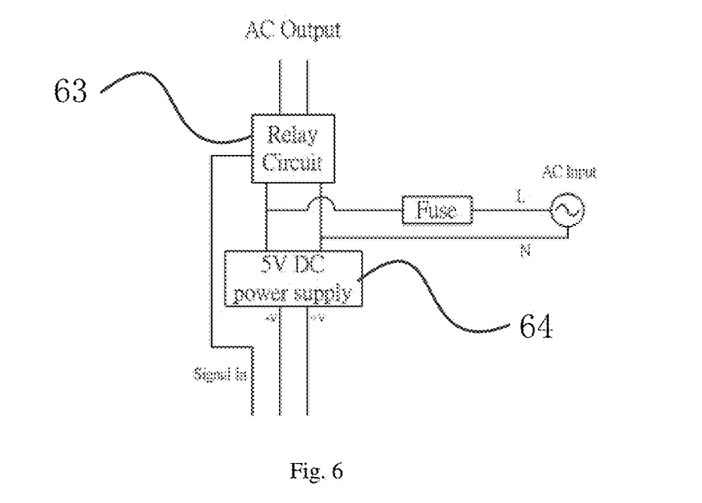
FIG. 6 is a structural diagram of the wired power controller of the power switch controller in one embodiment of the present invention.

Referring to FIG. 5 and FIG. 6, in this embodiment, the WiFi intelligent controller 10 runs the program in full switch mode so that the number of control switches can be increased. The power switch controller used is wired power controller 35 which can connect and control some wired wall-mounted appliances, such as chandeliers, etc. Inside the wired power controller 35, there are relay 63 for controlling the switch of the firing line, a DC power supply 64 connected with and supplying power to the WiFi intelligent controller 10, and relevant signal lines.

Figure 7:
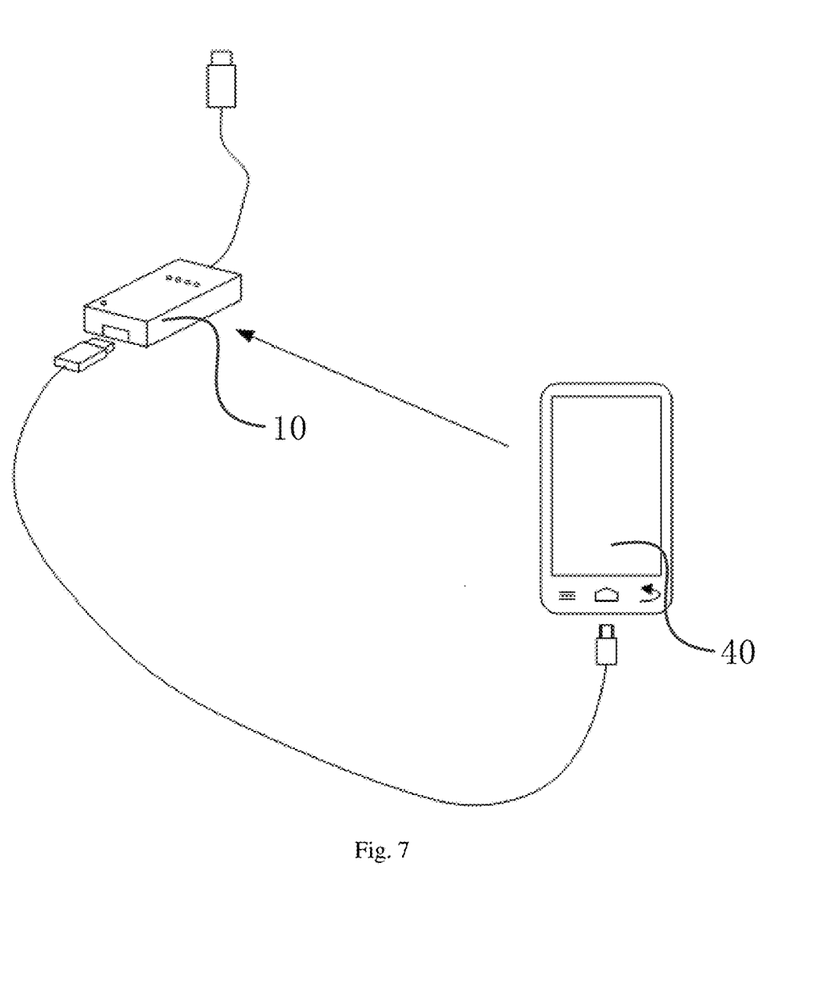
FIG. 7 is a structural diagram of the separated intelligent control system in a fourth embodiment of the present invention.

Referring to FIG. 7, the aforesaid WiFi intelligent controller 10 can also be used to charge smartphones. As shown in Table 1, there are two DC power supply pins in the first multi-use interface. One pin is used to supply power to external sensors. The other pin is used to supply power via the relay to external devices, such as LED lights, but this pin has another important usage, i.e. to control the charging of smartphones. Because when the program control module 40 is provided in the mobile phone, the mobile phone can be used as a server to control the whole separate intelligent control system in long term. However, many types of mobile phones have non-removable batteries. This feature ensures that only when the power of the battery of the mobile phone is in the user-specified range, for example between 20-30%, the charging is started and will be stopped when fully charged. This also ensures that the mobile phone will stop charging when it overheats and thus avoid being burnt.

Figure 8:
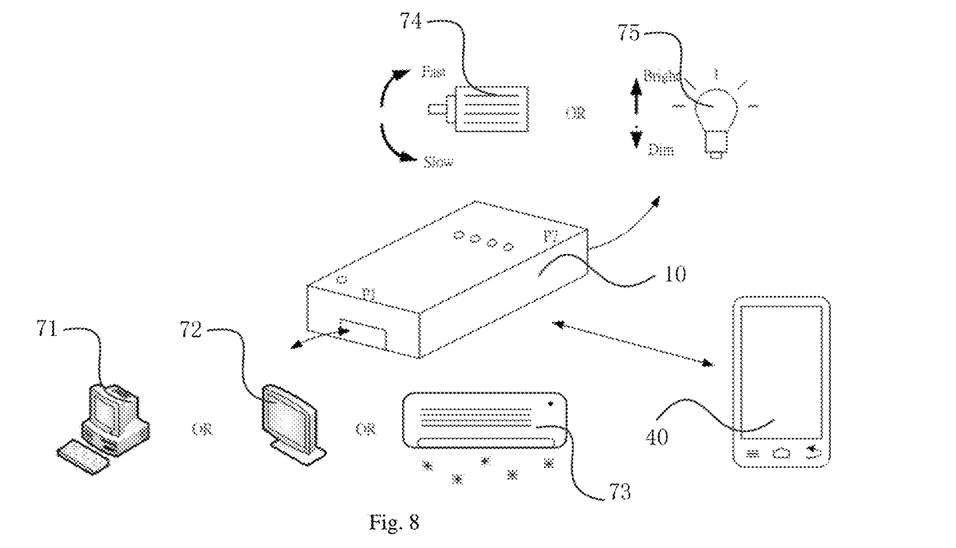
FIG. 8 is a structural diagram of the separated intelligent control system in a fifth embodiment of the present invention.

Referring to FIG. 8, in this embodiment, one of the multi-use interface 11 of the WiFi intelligent controller 10 runs program of PWM mode so that the WiFi intelligent controller 10 can control brightness of the lamp 75 or speed of the motor 74. Whereas, the other multi-use interface 11 are used as a UART (Universal Asynchronous Receiver/Transmitter) port to remote control the computer 71, TV 72 or air conditioner 73, etc.

The present invention also provides a setup method of separated intelligent control system for setting up the aforesaid separated intelligent control system. The setup method includes: first inserting the setup key 17 into the multi-use interface 11 of the WiFi intelligent controller 10 of the separated intelligent control system, and then connecting the WiFi intelligent controller 10 to power supply, such as USB power supply, so the WiFi intelligent controller 10 enters into AP (Access Point) mode and accepts networking; using the program control module 40 to connect with the separated intelligent control system via SSID of the WiFi intelligent controller 10; the program control module 40 sending setting related information to the WiFi intelligent controller 10; finally removing the power and the setup key 17 and reconnect to the power so that the WiFi intelligent controller 10 operates according to the settings. The relevant information can be encrypted when sending out so as to identify the user. In encryption, 256 bits AES encryption can be used in transmitting all information and instructions, including communication (an additional AES encryption other than WiFi) between the program control module 40 and the WiFi intelligent controller 10 and remote communication (IP and SMS are encrypted in the same manner) between the program control module 40 and mobile phones. In setting up, since the controller only uses WAP, it is not necessary to select the encryption method. The IP of the WiFi intelligent controller 10 should be fixed and should be in the same subnet of AP. The subnet Mask of the WiFi intelligent controller 10 may be the same as that of AP.

The WiFi intelligent controller 10 of the present invention has multi-use interfaces whose functions can be freely defined and has a modular design that can be connected to multiple external modules. This will make this inventive product sustainably develop even if it is produced. When the WiFi intelligent controller 10 is inserted in a socket module, it becomes a WiFi socket for electric appliances. When the WiFi intelligent controller 10 is connected to power switch and installed to the chandelier, it becomes an intelligent chandelier. When the WiFi intelligent controller 10 is installed the garage gate, it becomes a remote control gate. When inserted with different sensors, it can also detect environmental data, such as temperature, humidity, brightness, human infrared, etc. and then make proper control. It can also make the program control module 40 as a server and provide remote control service to other mobile phones via IP or SMS connection. The present invention enhances the product's life cycle and sustainability. Because the peripheral modules of this product are independent, it is possible in the future to develop new peripheral modules, such as different types of switches, infrared control or new sensors, etc. Regarding the WiFi intelligent controller 10, the performance thereof can be enhanced through firmware upgrade. In addition, the control program and the server part can be run on the program control module 40, the life cycle of existing mobile phones can be extended as well so that electronic waste can be reduced.

Specific embodiments of the present invention have been fully described. Those skilled in the art can have multiple variant implementation of the invention, without departing from the scope and spirit of the present invention. For example, the feature shown or described as part of one embodiment herein may be used in another embodiment to yield a further embodiment. The above only includes some preferred embodiments of the invention, and therefore is not to limit the scope of protection. Any equivalent variation by use of the specification and the accompanying drawings of the present invention will fall within the scope of the claimed invention.

What is claimed is:

1. A separated intelligent control system comprising a wireless networking intelligent controller, said wireless networking intelligent controller comprising:
   a wireless networking unit for performing network communication;
   a microprocessor connected with said wireless networking unit for data transmission via said wireless networking unit, said data comprising programs or instructions; and
   at least one multi-use interface, said multi-use interface comprising a plurality of pins, said plurality of pins being connected to said microprocessor; said microprocessor being used to change function of said plurality of pins of said multi-use interface via firmware;
   wherein the separated intelligent control system further comprises an external module connected to said multi-use interface, and said external module comprises a power switch controller or sensor.

2. The separated intelligent control system of claim 1, wherein the number of multi-use interfaces is two, said plurality of pins comprising power type pins and data type pins.

3. The separated intelligent control system of claim 2, wherein all said data type pins of said multi-use interfaces can be set to GPIO mode for sending or receiving 0 or 1 signal to control on or off of external modules, and for communicating with external sensors and receiving feedback of said external sensors.

4. The separated intelligent control system of claim 2, wherein said data type pins of said multi-use interfaces comprises PWM signal output pins for controlling strength of power consumption of external modules so as to control brightness of a lamp or speed of a motor.

5. The separated intelligent control system of claim 2, wherein said power type pins of said multi-use interfaces comprise direct DC power supply pins or DC power supply pins controlled by instruction.

6. The separated intelligent control system of claim 1, wherein said plurality of pins of said multi-use interface can be changed firmware through said microprocessor and set as UART to connect with external serial port terminal.

7. The separated intelligent control system of claim 1 further comprising a setup key for being inserted into said multi-use interface to enable setup of said wireless networking intelligent controller.

8. The separated intelligent control system of claim 1 further comprising a firmware replacement key for being inserted into said multi-use interface to enable upgrade or replacement of firmware.

9. The separated intelligent control system of claim 1 further comprising an encryption unit connected with said microprocessor for performing AES256 data encryption and decryption on data sent by said wireless networking unit, said AES256 data encryption and decryption using a master key and a secondary key to encrypt and decrypt different data; wherein said master key is acquired by a specific operation and is used to decrypt user-defined password; said secondary key being obtained by process of said user-defined password and being used for encryption and decryption of data transmission or storage.

10. The separated intelligent control system of claim 1 further comprising a program control module for controlling said wireless networking intelligent controller by running appropriate program, or set as a server to centrally manage multiple said wireless networking intelligent controllers online.

11. The separated intelligent control system of claim 10, wherein said program control module is on a mobile terminal or computer.

12. A setup method of a separated intelligent control system for setting up said separate intelligent control system of claim 1, comprising:
inserting said setup key into said multi-use interface of said wireless networking intelligent controller and then connecting said wireless networking intelligent controller to power supply so that said wireless networking intelligent controller is switched to AP mode for setting up said wireless networking intelligent controller;
using said program control module to connect with said separated intelligent control system via SSID of said wireless networking intelligent controller;
said program control module sending setting related information to said wireless networking intelligent controller.

13. The setup method of a separated intelligent control system of claim 12, wherein except for firmware, all information and instructions transmitted after setting are set with passwords and keys are encrypted by AES256.

14. The separated intelligent control system of claim 1, wherein said power switch controller comprising a relay for controlling the firing switch; the separated intelligent control system further comprising a DC transformer for connecting with and supplying power to said WiFi wireless networking intelligent controller.

15. The separated intelligent control system of claim 14, wherein said power switch controller is wired power controller or socket.

16. The separated intelligent control system of claim 1, wherein said sensor is used to detect ambient temperature, humidity, brightness or human infrared or used as a switch.

17. A separated intelligent control system comprising a wireless networking intelligent controller, said wireless networking intelligent controller comprising:
a wireless networking unit for performing network communication;
a microprocessor connected with said wireless networking unit for data transmission via said wireless networking unit, said data comprising programs or instructions;
at least one multi-use interface, said multi-use interface comprising a plurality of pins, said plurality of pins being connected to said microprocessor; said microprocessor being used to change function of said plurality of pins of said multi-use interface via firmware; and
an encryption unit connected with said microprocessor for performing AES256 data encryption and decryption on data sent by said wireless networking unit, said AES256 data encryption and decryption using a master key and a secondary key to encrypt and decrypt different data; wherein said master key is acquired by a specific operation and is used to decrypt user-defined password; said secondary key being obtained by process of said user-defined password and being used for encryption and decryption of data transmission or storage;
wherein the separated intelligent control system further comprises an external module connected to said multi-use interface, and said external module comprises a power switch controller or sensor;
a setup key for being inserted into said multi-use interface to enable setup of said wireless networking intelligent controller; and
a firmware replacement key for being inserted into said multi-use interface to enable upgrade or replacement of firmware.

* * * * *